(12) United States Patent
Mahaffey et al.

(10) Patent No.: US 11,923,664 B2
(45) Date of Patent: Mar. 5, 2024

(54) POWER LINE FILTERING AT EQUIPMENT RACK AND MODULE LEVELS

(71) Applicant: Dell Products L.P., Round Rock, TX (US)

(72) Inventors: Colin Mahaffey, Austin, TX (US); Tony P. Middleton, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 17/571,702

(22) Filed: Jan. 10, 2022

(65) Prior Publication Data
US 2023/0223743 A1 Jul. 13, 2023

(51) Int. Cl.
*G06F 1/26* (2006.01)
*H02B 1/015* (2006.01)

(52) U.S. Cl.
CPC ............... *H02B 1/015* (2013.01); *G06F 1/26* (2013.01)

(58) Field of Classification Search
CPC ... H02B 1/015; G06F 1/26; G06F 1/28; G06F 1/189
See application file for complete search history.

(56) References Cited

U.S. PATENT DOCUMENTS

| | | | | |
|---|---|---|---|---|
| 4,621,199 A | * | 11/1986 | Bailey | H05K 9/0066 361/49 |
| 4,703,195 A | * | 10/1987 | Bailey | H05K 9/0066 361/48 |
| 6,166,458 A | | 12/2000 | Redburn et al. | |
| 6,288,917 B1 | | 9/2001 | Redburn et al. | |
| 8,223,468 B2 | | 7/2012 | Januszewski et al. | |
| 11,131,694 B1 | * | 9/2021 | Pan | G01R 19/16595 |
| 2012/0195355 A1 | * | 8/2012 | El-Essawy | H04B 3/56 375/257 |

OTHER PUBLICATIONS

M. Guri et al., "ODINI : Escaping Sensitive Data from Faraday-Caged, Air-Gapped Computers via Magnetic Fields," arXiv:1802.02700v1, Feb. 8, 2018, 18 pages.
Bantam Clean Power, "Power Line Emission (PLE) Resources," https://www.bantamcleanpower.com/ple/, Accessed Oct. 19, 2021, 7 pages.
Director of National Intelligence, "Sensitive Compartmented Information Facilities," Intelligence Community Directive No. 705, May 26, 2010, 3 pages.

(Continued)

*Primary Examiner* — Sherman Ng
(74) *Attorney, Agent, or Firm* — Ryan, Mason & Lewis, LLP (57) ABSTRACT

An apparatus comprises one or more power distribution units, and a power line filter device electrically connected to the one or more power distribution units. The power line filter device is configured to be electrically connected to a power source for the one or more power distribution units at a location between the power source and the one or more power distribution units. The power line filter device is configured to condition one or more signals in one or more power lines to prevent emission of data corresponding to one or more information technology devices.

20 Claims, 4 Drawing Sheets

(56) References Cited

OTHER PUBLICATIONS

Department of Defense, "Sensitive Compartmented Information Facilities Planning, Design, and Construction," Unified Facilities Criteria (UFC) Feb. 1, 2013, Change 1, Oct. 1, 2013, 57 pages.
Electrical Installation Wiki, "Distribution Switchboards," https://www.electrical-installation.org/enwiki/Distribution_switchboards, Feb. 11, 2021, 17 pages.
Shawn, "All about Proximity Sensors: Which type to use?" https://www.seeedstudio.com/blog/2019/12/19/all-about-proximity-sensors-which-type-to-use/, Dec. 19, 2019, 16 pages.
National Counterintelligence and Security Center, "Technical Specifications for Construction and Management of Sensitive Compartmented Information Facilities," Version 1.5.1, IC Tech Spec—for ICD/ICS 705, Jul. 26, 2021, 125 pages.
F. Walther Electric Corporation, "IEC Pin & Sleeve Devices," https://www.waltherelectric.com/products-us/iec-60309-pin-sleeve-devices/, Accessed Jan. 4, 2022, 8 pages.
Bantam Clean Power, "Power Line Exfiltration (PLE) Prevention," https://www.bantamcleanpower.com/what-is-ple-and-how-can-bantam-prevent-it/, Accessed Jan. 7, 2022, 6 pages.
Bantam Clean Power, "Model SA3600A—Product Specifications," Accessed Jan. 7, 2022, 2 pages.
Wikipedia, "Low-pass Filter," https://en.wikipedia.org/wiki/Low-pass_filter, Aug. 16, 2021, 9 pages.
Electronic Base, "Low Pass Filter Calculator," https://electronicbase.net/low-pass-filter-calculator/, Accessed Jan. 7, 2022, 9 pages.
Panasonic Corporation, "Basic Knowledge of LC Filters," https://industrial.panasonic.com/ww/ss/technical/b4, May 26, 2020, 9 pages.
Electronic Notes, "Constant-K LC Band Pass Filter Circuit Design & Calculations," https://www.electronics-notes.com/articles/radio/rf-filters/constant, Accessed Jan. 7, 2022, 4 pages.
Electronic Base, "Band Pass Filter Calculator," https://electronicbase.net/band-pass-filter-calculator/, Accessed Jan. 7, 2022, 9 pages.
M. Guri et al., "MAGNETO: Covert Channel between Air-Gapped Systems and Nearby Smartphones via CPU-Generated Magnetic Fields," Future Generation Computer Systems, vol. 115, Feb. 2021, pp. 115-125.
M. Guri et al., "PowerHammer: Exfiltrating Data from Air-Gapped Computers through Power Lines," arXiv:1804.04014v1, Apr. 10, 2018, 15 pages.
B. Zhao et al., "Powermitter: Data Exfiltration from Air-Gapped Computer through Switching Power Supply," Computer System Security, vol. 15, No. 2, Feb. 15, 2018, pp. 170-189.

\* cited by examiner

POWER LINE FILTERING AT EQUIPMENT RACK AND MODULE LEVELS

FIELD

The field relates generally to electronic equipment, and more particularly to structures for prevention of data capture from power lines.

BACKGROUND

Some modular datacenters, enclosures and equipment racks may have security requirements based on, for example, their classification and location. Such requirements may include, for example, resistance to forced and covert entry, sound attenuation and countermeasures for electronic emanations.

In some cases, it may be possible to extract data from information technology (IT) equipment by capturing data present in power lines. Such capture can be performed over the air without contacting the power lines using, for example, proximity sensors.

SUMMARY

Illustrative embodiments provide a configuration for installation of a power line filter device to prevent data capture from power lines at equipment rack and module levels.

In one embodiment, an apparatus comprises one or more power distribution units, and a power line filter device electrically connected to the one or more power distribution units. The power line filter device is configured to be electrically connected to a power source for the one or more power distribution units at a location between the power source and the one or more power distribution units.

Such an arrangement advantageously provides an upstream design that protects IT equipment at equipment rack and module levels. For example, IT equipment data capture from power lines can be prevented at the equipment rack level by locating a power line filter device between a power distribution switchboard and a power distribution unit (PDU) of an equipment rack. Additionally, IT equipment data capture from power lines can be prevented at the module level by locating a power line filter device between a power source (e.g., input power from a facility) and a distribution switchboard of a modular datacenter having multiple equipment racks and PDUs.

These and other embodiments include, without limitation, apparatus, systems and methods.

DETAILED DESCRIPTION

Illustrative embodiments will be described herein with reference to exemplary power line filter device configurations where a power line filter device is installed upstream of electronic equipment rack PDUs. It is to be appreciated, however, that the embodiments are not restricted to the particular illustrative configurations shown. Terms such as "electronic equipment racks" as used herein are intended to be broadly construed, so as to encompass, for example, a wide variety of arrangements of housings for electronic equipment, such as, but not necessarily limited to, chassis and frames, which may be used to house different arrangements of storage drives, processors, servers or other types of computer components and electronic equipment.

Figure 1:
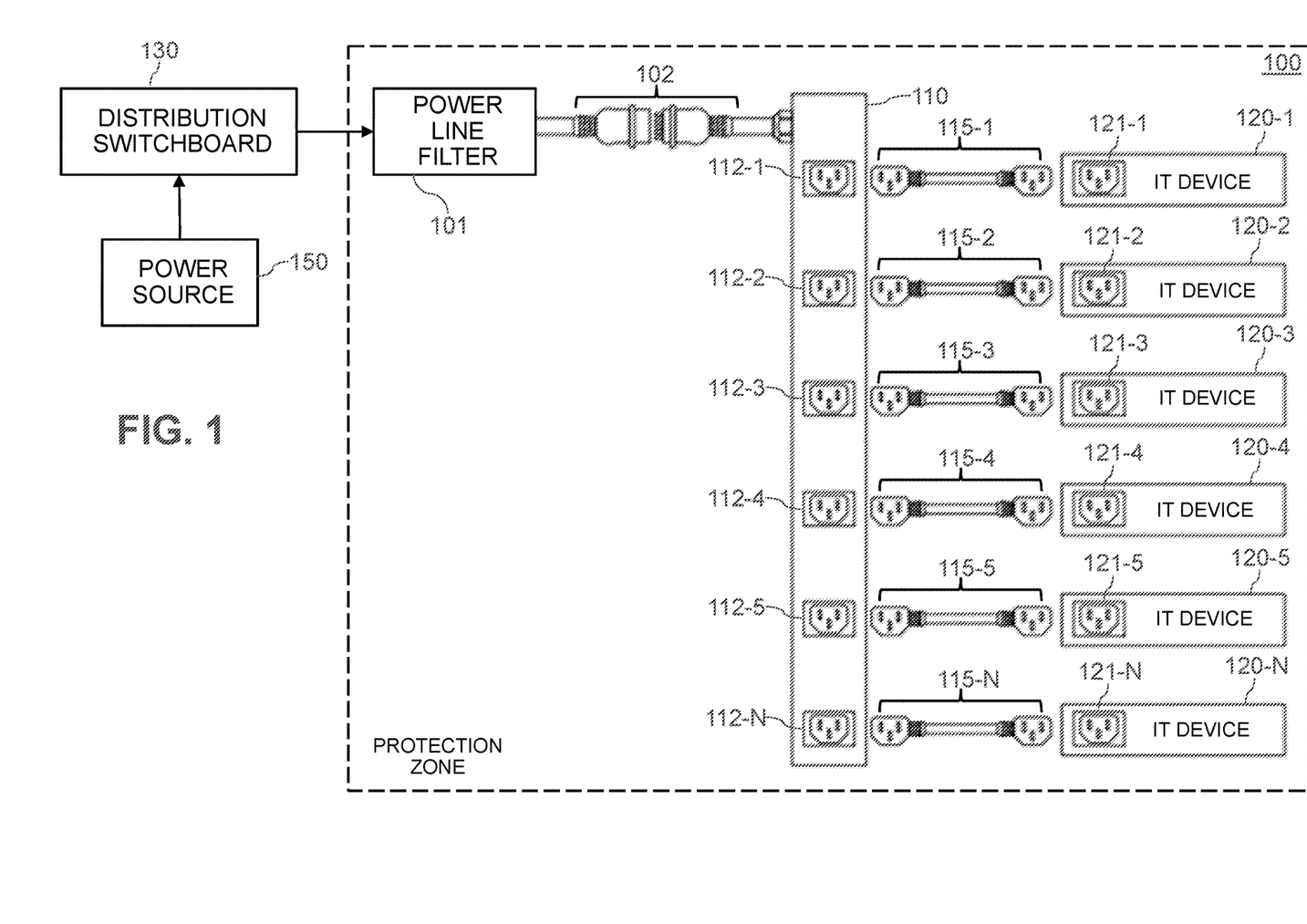
FIG. 1 depicts a schematic view of a configuration in which a power line filter device is positioned between a power distribution switchboard and a PDU of an equipment rack in an illustrative embodiment.
Figure 2:
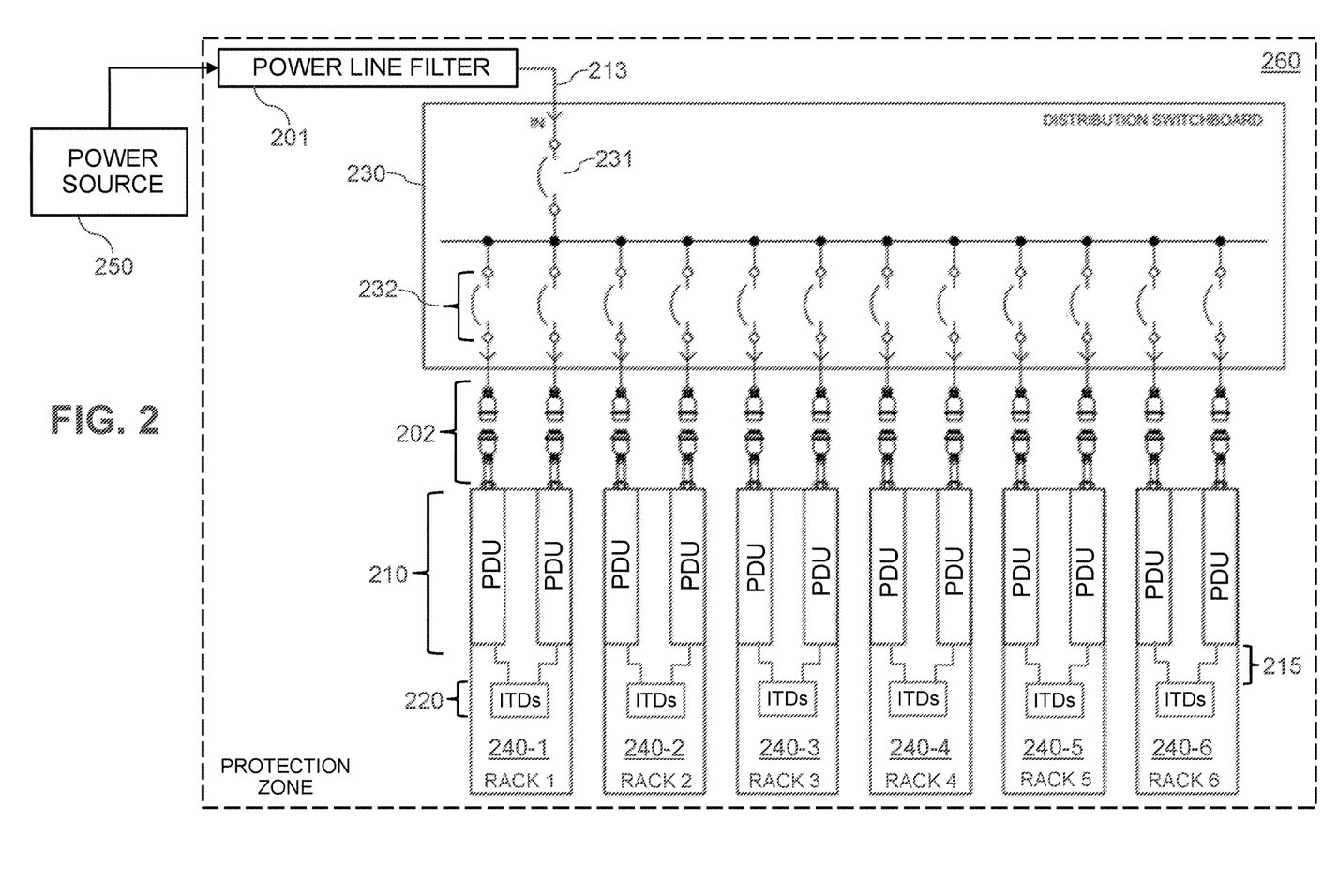
FIG. 2 depicts a schematic view of a configuration in which a power line filter device is positioned between a power source and a power distribution switchboard of an equipment module in an illustrative embodiment.

Referring to FIG. 1, an electronic equipment rack 100 includes a PDU 110 comprising first female receptacles 112-1, 112-2, 112-3, 112-4, 112-5, . . . , 112-N (collectively "first female receptacles 112") and a plurality of IT devices 120-1, 120-2, 120-3, 120-4, 120-5, . . . , 120-N (collectively "IT devices 120") respectively comprising second female receptacles 121-1, 121-2, 121-3, 121-4, 121-5, . . . , 121-N (collectively "second female receptacles 121"). The IT devices 120 are electrically connected to the PDU 110 via respective power lines 115-1, 115-2, 115-3, 115-4, 115-5, . . . , 115-N (collectively "power lines 115") each comprising two male plugs for plugging into respective first and second female receptacles 112 and 121 and at least one conductive wire or cable between the two male plugs. The IT devices 120 include, but are not necessarily limited to, storage drives, processors, servers, network switches and other computing devices. The letter N represents an integer greater than 1, as the number of first and second female receptacles 112 and 121, power lines 115 and IT devices 120 in the electronic equipment rack 100 may vary. For example, the number of IT devices 120, and corresponding power lines 115 and receptacles 112/121 may be in the hundreds. Additionally, as shown in FIG. 2, an equipment rack may further comprise more than one PDU. According to one or more embodiments, the first and second female receptacles 112 and 121 comprise C13 outlet connectors rated for a maximum current of 10 amperes (A), a maximum voltage of 250 volts (V) and a maximum pin temperature of 70 degrees Celsius, C19 outlet connectors rated for a maximum current of 16 A, a maximum voltage of 250V and a maximum pin temperature of 70 degrees Celsius, or other known connectors.

The electronic equipment rack 100 includes a power line filter device 101 electrically connected to the PDU 110 via at least one power line 102. In the embodiment in FIG. 1, the power line 102 comprises a combination of male and female connectors at ends of conductive wires or cables respectively extending from the power line filter device 101 and the PDU 110. The power line filter device 101 is connected upstream of the PDU 110 and of the IT devices 120 via the power line 102, which is located upstream of the power lines 115. The power line filter device 101 is electrically connected to a distribution switchboard 130, and to a power source 150. The power line filter device 101 is connected downstream of the distribution switchboard 130 and the power source 150 at a location between the distribution switchboard 130 and the PDU 110 (also between the power source 150 and the PDU 110). The power source 150 may comprise, for example, input power to a facility (e.g., facility feed). The input to the power line filter device 101 from the distribution switchboard 130 may be hardwired. Alternatively, the power line filter device 101 can include a female receptacle (e.g., IEC60309 connector) to receive input from the distribution switchboard 130.

According to an embodiment, the power line filter device 101 is configured to condition signals in power lines 102 and/or 115 to prevent unwanted emission of data corresponding to the IT devices 120. In more detail, the power line filter device 101 functions as a power line emission firewall to prevent, for example, unwanted power line emission and capturing of, for example, switched mode power supply imprint and CPU transistor signals from the IT devices 120. The power line filter device 101 is also configured to prevent signals carrying data corresponding to the IT devices 120 from being induced onto conductive ground lines. According to an embodiment, the power line filter device 101 reforms voltage and current waveshapes to a flattened or linear profile so that one IT device (e.g., 120-1) cannot be uniquely identified from another IT device (e.g., IT device 120-2) based on electrical properties, and prevents inductive coupling of magnetic fields. As a result, the power line filter device 101 is able to remove and/or obfuscate signals from power lines (e.g., power lines 102 and/or 115) that could convey exploitable information of the IT devices 120. In one or more embodiments, the power line filter device 101 operates in a 100-240 voltage in alternating current (VAC) environments. As can be seen in FIG. 1, the power line filter device 101 is electrically connected to the PDU 110 through at least one power line 102 upstream of the PDU 110 and of the power lines 115 electrically connecting the IT devices 120 to the PDU 110.

According to an embodiment, the distribution switchboard 130 is electrically connected to the power source 150 and to the power line filter device 101, and comprises a plurality of circuit breakers. As described in more detail in connection with FIG. 2, in an embodiment, the circuit breakers may comprise thermal magnetic tripping units (TMTUs) (e.g., 30 A TMTUs).

Referring to FIG. 2, an equipment module 260 such as, for example, a modular datacenter, comprises a plurality of equipment racks 240-1, 240-2, 240-3, 240-4, 240-5, 240-6 (collectively "equipment racks 240"). Although 6 equipment racks 240 are shown in FIG. 2, the embodiments are not necessarily limited thereto, and there may be more or less than 6 equipment racks 240 in an equipment module 260. As shown in FIG. 2, each equipment rack 240 comprises 2 PDUs 210, which are each electrically connected to a plurality of IT devices (ITDs 220) via a plurality of power lines 215 in a similar manner to the connections between the IT devices 120, power lines 115 and the PDU 110 of FIG. 1. Although 2 PDUs 210 are shown in each equipment rack 240, the embodiments are not necessarily limited thereto, and there may be more or less than 2 PDUs 210 in an equipment rack 240. In a non-limiting illustrative example, a 6-equipment rack module, such as equipment module 260 in FIG. 2, may comprise 576 IT devices 220 in each equipment rack 240.

The equipment module 260 includes a distribution switchboard 230. Similar to the distribution switchboard 130 described herein above, the distribution switchboard includes a plurality of circuit breakers 232. According to an embodiment, the amperage of the distribution switchboard 230, which depends on the number of racks and their overall capacity, may be in the range of, for example, 200 A to 2000 A. Depending on the amperage of the distribution switchboard 230, each circuit breaker 232 may comprise, but is not necessarily limited to, 20 A, 30 A or 60 A circuit breakers (e.g., TMTUs). The distribution switchboard 230 is electrically connected to the plurality of PDUs 210 via respective ones of a plurality of power lines 202 corresponding to respective ones of the plurality of circuit breakers 232. The power lines 202 may be the same or similar to the power line 102 used for electrically connecting the power line filter device 101 to the PDU 110. The distribution switchboard 230 further comprises a main circuit breaker 231 provided upstream of the plurality of circuit breakers 232. In non-limiting illustrative embodiments, depending on the amperage of the distribution switchboard 230, the main circuit breaker 231 comprises, for example, a 200 A or 400 A circuit breaker (e.g., TMTU). In the case of a 400 A distribution switchboard 230, the corresponding voltage, phase and wattage values may be, for example, 415V, 3-phase AC voltage (3PH), 4 watts (W)+ground (GND), or 208V, 3PH, 4W+GND. Some example distribution voltages for the distribution switchboard 230 include, for example, 400V/230V, 208V/120V and 480V/277V for 3PH applications at any of the given range of amperages for the distribution switchboard 230.

As shown in FIG. 2, the distribution switchboard 230 is electrically connected to a power line filter device 201 and to the PDUs 210 at a location upstream from the PDUs 210 and downstream from the power line filter device 201. For example, the distribution switchboard 230 is electrically connected to the power line filter device 201 and to the PDUs 210 at a location between the power line filter device 201 and the PDUs 210. The power line filter device 201 is electrically connected to a power source 250 at a location downstream of the power source 250. The power source 250 is the same or similar to the power source 150 and may comprise, for example, input power to a facility (e.g., facility feed). The input to the power line filter device 201 from the power source 250 may be hardwired to accept industry standard lug patterns. Alternatively, the power line filter device 201 can include a female receptacle (e.g., IEC60309 connector) to receive input from the power source 250.

The power line filter device 201 is electrically connected to the distribution switchboard 230 through at least one power line 213 upstream of the distribution switchboard 230, the PDUs 210 and of the power lines 215 electrically connecting the IT devices 220 of the equipment racks 240 to the PDUs 210. According to an embodiment, the at least one power line 213 comprises a hardwired connection to accept industry standard lug patterns. Alternatively, the at least one power line 213 may be similarly configured to, for example, the power lines 102/202 or 115/215. The distribution switchboard 230 is electrically connected to the PDUs 210 through power lines 202 located upstream of the PDUs 210 and of the power lines 215 and downstream of the power line 213. The PDUs 210 can be the same or similar to the PDU 110, including receptacles the same or similar to the first female receptacles 112.

The power line filter device 201 is the same or similar to the power line filter device 101, and is configured to condition signals in power lines 202, 213 and/or 215. The conditioning prevents unwanted emission of data corresponding to the IT devices 220 in the equipment racks 240. Similar to the power line filter device 101, the power line filter device 201 functions as a power line emission firewall to prevent unwanted power line emission, induction and capturing of signals carrying data corresponding to the IT devices 220 of the equipment racks 240. According to an embodiment, like the power line filter device 101, the power line filter device 201 reforms voltage and current waveshapes to a flattened or linear profile so that one IT device 220 cannot be uniquely identified from another IT device 220 based on electrical properties, and prevents inductive coupling of magnetic fields. As a result, the power line filter device 201 is able to remove and/or obfuscate signals from power lines (e.g., power lines 202, 213 and/or 215) that could convey exploitable information of the IT devices 220 in the equipment racks 240.

As shown by the dotted boxes in FIGS. 1 and 2 illustrating protection zones, the protection from unwanted power line emissions is at the equipment rack or module levels depending on the upstream location of the power line filter devices 101 or 201. For example, the configuration in FIG. 1, where the power line filter device 101 is located upstream of the PDU 110 and the IT devices 120, and downstream of the distribution switchboard 130 and the power source 150, provides protection from power line emissions at the equipment rack level. The configuration in FIG. 2, where the power line filter device 201 is located downstream of the power source 250 and upstream of the distribution switchboard 230 and of the equipment racks 240 comprising the PDUs 210 and IT devices 220, provides protection from power line emissions at the equipment module level. Depending on its location, a power line filter device 101 or 201 may be sized based on, for example, ampacity (e.g., 30 A in the FIG. 1 configuration or 200 A in the FIG. 2 configuration).

Figures 3A, 3B, 3C:
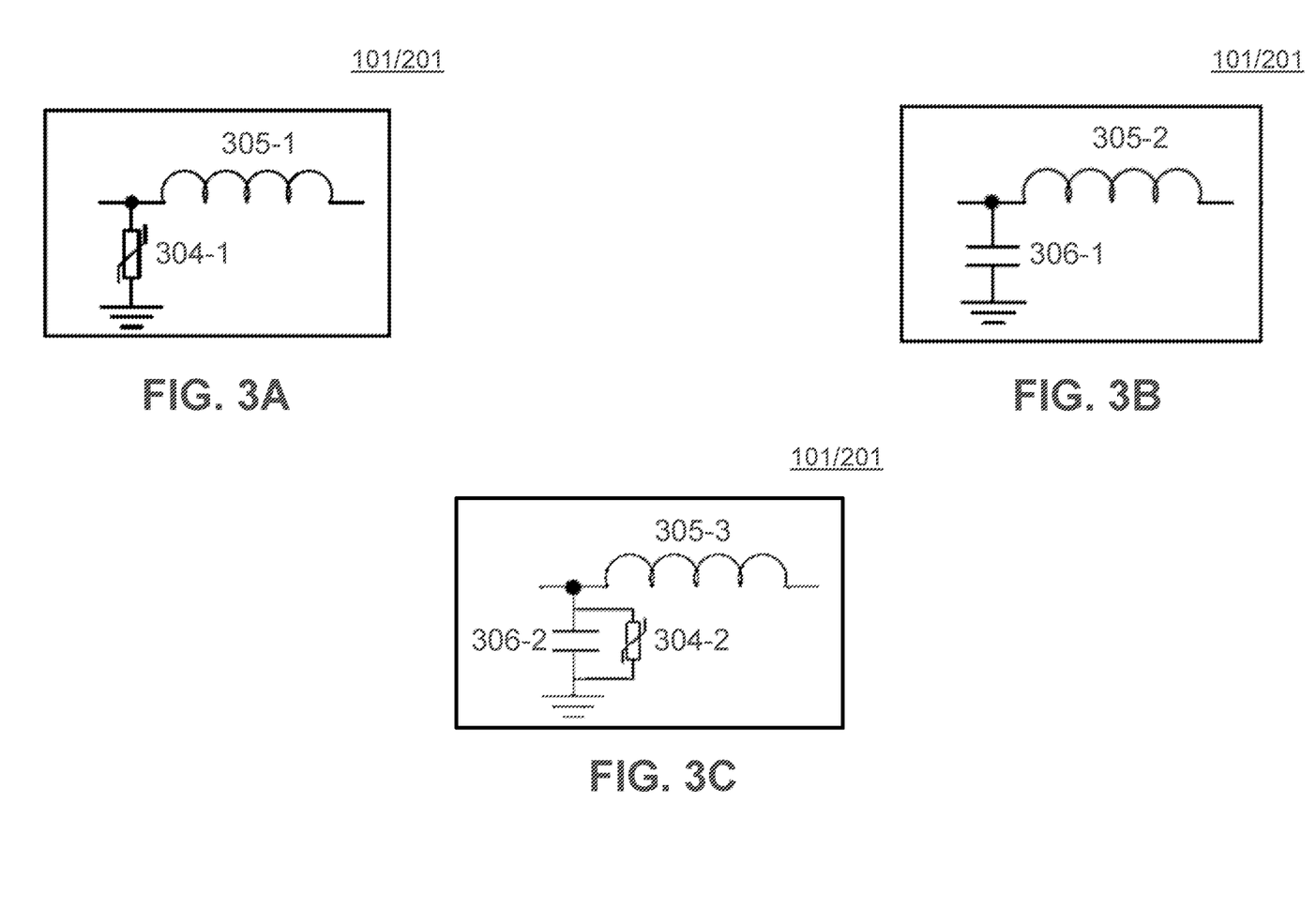
FIGS. 3A, 3B and 3C depict power line filter devices in illustrative embodiments.

Referring to FIGS. 3A, 3B and 3C, the power line filter devices 101 and 201 respectively comprise one or more varistors 304-1, 304-2 (e.g., a metal-oxide varistor (MOV)) (collectively "varistors 304"), inductors 305-1, 305-2, 305-3 (collectively "inductors 305") and/or capacitors 306-1, 306-2 (collectively "capacitors 306"). In one or more embodiments, optional or different numbers of varistors and/or capacitors may be employed between phase, ground and neutral connections to provide additional filtering and surge protection. The values of inductance L and capacitance C (e.g., henry (H) and farad (F) values) for the inductors 305 and capacitors 306, and the resistance values (e.g., ohm (Ω) values) of the varistors 304 would correspond to the specific frequencies the power lines 102, 202, 213, 115 and/or 215 that would need to be conditioned and/or filtered (e.g., attenuated or blocked), as well as the size of the power line filter device 101 and 201. As noted herein above, the size of the power line filter devices 101 and 201 may be based on, for example, ampacity. One or more software applications may be used to model the performance of the power line filter devices 101 and 201 in connection with various frequencies and ampacity. In a non-limiting illustrative example, the power line filter device 101 or 201 can comprise a power line emission firewall device, similar in some aspects to the Vertiv® Geist® PLE115 power line emission firewall device, commercially available from Lodestone LLC (dba Bantam Clean Power) of Anaheim, CA, but modified in the manner disclosed herein, for example, to support additional amperage.

As noted herein, in one or more embodiments, the power line filter devices 101 and 201 each comprise a filter including a combination of one or more inductors 305 with varistors 304 and/or capacitors 306 to attenuate, block or pass specific frequencies of electric signals. The power line filter devices 101 and 201 can include, but are not necessarily limited to, low pass filters (e.g., L-type, Π-type, T-type), high pass filters, band pass filters, notch filters and combinations thereof. In addition to varistors 304, inductors 305 and capacitors 306, the power line filter devices 101 and 201 can include other components, such as, for example, resistors.

In one or more embodiments, the cut-off frequency f of a power line filter device 101/201 (e.g., the threshold frequency such that frequencies higher than the cut-off frequency would be attenuated or blocked) is calculated according to the following formula (1):

$$f_c = \frac{1}{2\pi\sqrt{LC}} \quad (1)$$

where L and C represent inductance and capacitance values in an LC circuit. In one or more embodiments, the cut-off frequency $f_c$ is higher than standard nominal frequencies of 60 Hz in the United States of America, and 50 Hz in Europe.

In some embodiments, capacitance and inductance may be calculated based on characteristic impedance $Z_0$. The characteristic impedance of a uniform transmission line is the ratio of the amplitudes of voltage and current of a single wave propagating along the line. Based on the characteristic impedance $Z_0$ and the cut-off frequency $f_c$, capacitance C and inductance L may be calculated based on the following formulas (2) and (3):

$$C = \frac{1}{2\pi Z_o f_c} \quad (2)$$

$$L = \frac{Z_0}{2\pi f_c} \quad (3)$$

As will be appreciated by one skilled in the art, the particular resistance, C and L values used in a given embodiment will vary depending upon the particular signal frequencies to be filtered out, as well as a particular circuit configuration of the power line filter device 101/202. For example, frequencies to be filtered can be outside the range of the standard nominal frequencies and have values on the order of kHz, MHz and GHz. In a non-limiting illustrative example, an approximate 2 mH inductance would be used in line, neutral and ground connections to provide significant attenuation at higher frequency ranges (e.g., >10 kHz) on a nominal 50 Hz or 60 Hz distribution system. The above-mentioned software modeling may be used to fine-tune the C and L values, as well as values for additional or alternative components such as MOVs and resistors, as will be appreciated by those skilled in the art. Other values and numerous alternative filter configurations can be used in other embodiments. In addition. where applications do not permit additional inductance in ground or neutral paths (due to, for example, regulatory and/or code requirements), alternative filtering methods may be employed to achieve attenuation to protect against power line exploitations.

In different applications, the PDUs 110 and 210 may correspond to different amperages ranging from, for example, 10 A to 100 A. For example, the PDUs 110 and 210 may be 20 A, 30 A, 60 A or 100 A. In a non-limiting example, in the case of a 30 A PDU 110, the power line filter device 101 would comprise a capacitor and inductor configuration based, at least in part, on a minimum rating of 30 A and 500V. In keeping with the non-limiting example of a 30 A PDU 110, the power line 102 may comprise, for example, a 30 A IEC60309 connector. Similarly, in the case of 30 A PDUs 210 and 30 A circuit breakers 232, the power lines 202 may comprise, for example, 30 A IEC60309 connectors. Alternatively, in the case of lower or higher amperage PDUs and circuit breakers (e.g., 20 A or 60 A PDUs and circuit breakers), other IEC60309 connectors (e.g., 60 A or 100 A IEC60309 connectors) or other types of connectors (e.g., 20 A National Electrical Manufacturers Association (NEMA) connectors) rated for lower or higher amperages can be used.

Figure 4:
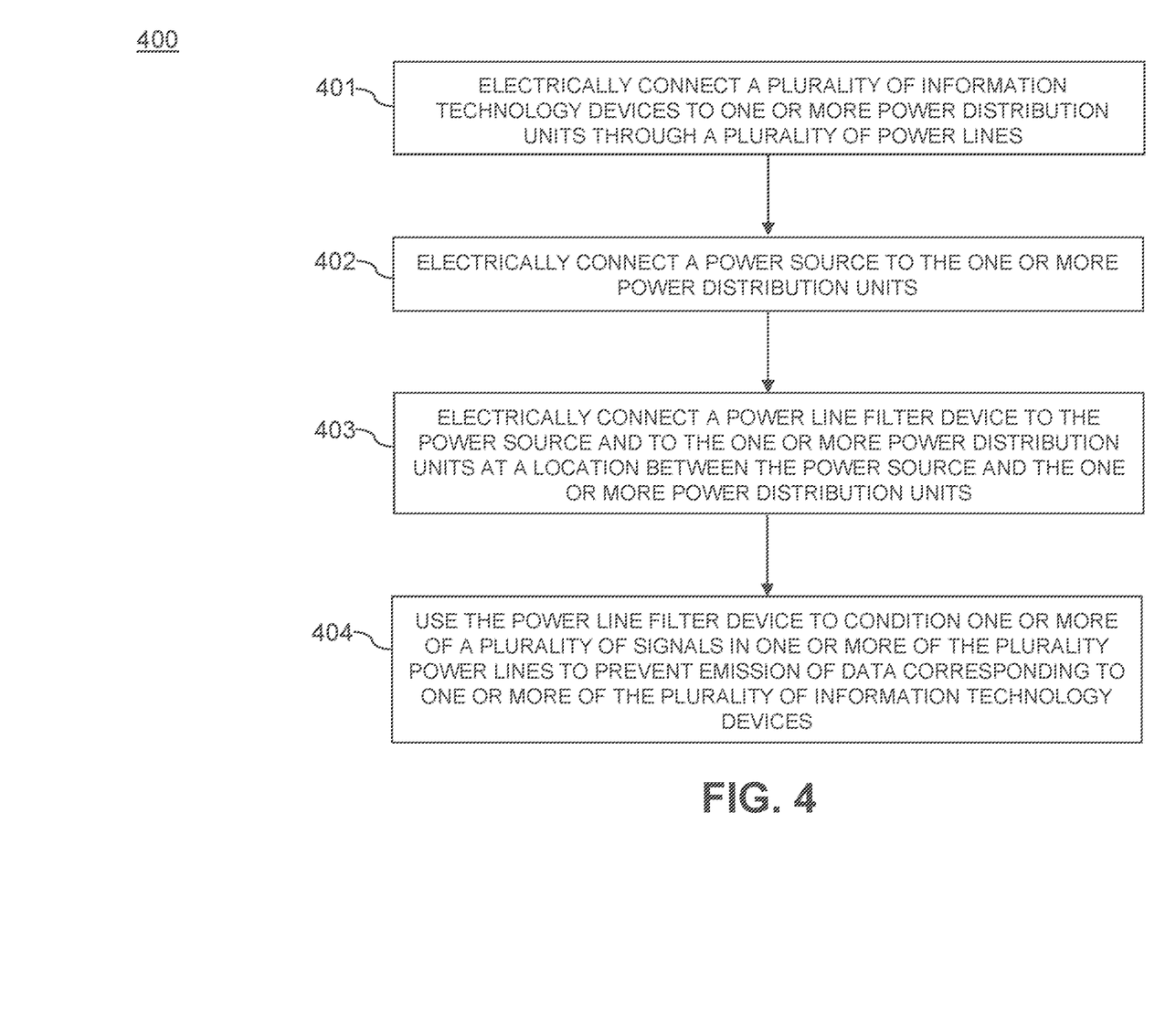
FIG. 4 depicts a process for preventing unwanted power line emissions at the equipment rack and module levels in an illustrative embodiment.

With reference to FIG. 4, a process 400 for preventing unwanted power line emissions at the equipment rack and module levels as shown includes steps 401 through 404, and is applicable to the power line filter configurations in FIGS. 1-3C, but is more generally applicable to other types of configurations designed to provide protection from power line emissions at the equipment rack and module levels.

In accordance with an embodiment, in a process 400 for preventing unwanted power line emissions, at step 401, a plurality of IT devices (e.g., IT devices 120/220) are electrically connected to one or more PDUs (e.g., PDUs 110/210) through a plurality of power lines (e.g., power lines 115/215). In the process 400 at step 402, a power source (e.g., power source 150/250) is electrically connected to the one or more PDUs, and, at step 403, a power line filter device (e.g., power line filter device 101/201) is electrically connected to the power source and to the one or more PDUs at a location between the power source and the one or more PDUs. In step 404, the power line filter device is used to condition one or more of a plurality of signals in one or more of the plurality of power lines to prevent emission of data corresponding to one or more of the plurality of IT devices.

In an embodiment of the process, a distribution switchboard (e.g., distribution switchboard 130) is electrically connected to a power source (e.g., power source 150) and to a power line filter device (e.g., power line filter device 101) at a location between the power source and the power line filter device. The power line filter device is electrically connected to the distribution switchboard at a location between the distribution switchboard and the one or more PDUs (e.g., PDU 110). The power line filter device is electrically connected to the one or more PDUs through at least one power line (e.g., power line 102) located upstream of the one or more PDUs and of a plurality of power lines (e.g., power lines 115) electrically connecting a plurality of IT devices (e.g., IT devices 120) to the one or more PDUs.

In an embodiment of the process, a distribution switchboard (e.g., distribution switchboard 230) is electrically connected to a power line filter device (e.g., power line filter device 201) and to one or more power distribution units (e.g., PDUs 210) at a location between the power line filter device and the one or more power distribution units. The distribution switchboard is electrically connected to the power line filter device through at least a first power line (e.g., power line 213) located upstream of the distribution switchboard. The process also includes electrically connecting the distribution switchboard to the one or more PDUs through at least a second power line (e.g., power line(s) 202) located upstream of the one or more PDUs and of a plurality of power lines (e.g., power lines 215) electrically connecting a plurality of IT devices (e.g., IT devices 220) to the one or more PDUs and downstream of the first power line.

It is to be appreciated that the FIG. 4 process and other features and functionality described above can be adapted for use with other types of power line filter arrangements configured to prevent unwanted power line emissions at the equipment rack and module levels.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

The embodiments advantageously address stealth entry protection requirements for modular datacenters, enclosures and equipment racks, which may have security requirements associated with one or more directives (e.g., Intelligence Community Directive (ICD)—705 for Sensitive Compartmented Information Facilities (SCIF)). In conventional arrangements, high speed and highly accurate power measuring equipment provides mechanisms for over the air detection and retrieval of signals. For example, magnetic fields generated by CPU throttling may create pulses that can be detected over the air, even when an isolated (e.g., air-gapped) computing device is enclosed in an electrical signal shield (e.g., Faraday cage).

The embodiments advantageously provide a power line filter device that can be located upstream of equipment rack PDUs and/or equipment module distribution switchboards to provide protection from power line exploitation at equipment rack and module levels. When compared with approaches that place power line filter devices in downstream locations, providing power line filter devices in the upstream locations of the embodiments avoids congested aisle space in racks and modules, facilitates module, rack and component serviceability, decreases integration cost and time, reduces cable complexity and reduces the weight of modules and/or racks. The embodiments further result in faster IT refresh cycles when compared with downstream approaches.

The arrangements shown in the illustrative embodiments of FIGS. 1-4 are presented by way of example for purposes of illustration only, and alternative embodiments can utilize other types of power line filter device arrangements. Accordingly, the particular configurations of components as shown in the figures can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   one or more power distribution units;
   a power line filter device electrically connected to the one or more power distribution units, wherein the power line filter device is configured to be electrically connected to a power source for the one or more power distribution units at a location between the power source and the one or more power distribution units; and
   a distribution switchboard configured to be electrically connected to the power source, wherein the power line filter device is electrically connected to the distribution switchboard at a location between the distribution switchboard and the one or more power distribution units, and wherein the distribution switchboard comprises a plurality of circuit breakers.

2. The apparatus of claim 1 further comprising a plurality of information technology devices electrically connected to the one or more power distribution units through a plurality of power lines, wherein the power line filter device is electrically connected to the one or more power distribution units through at least one power line located upstream of the one or more power distribution units and of the plurality of power lines electrically connecting the plurality of information technology devices to the one or more power distribution units.

3. The apparatus of claim 2 wherein the one or more power distribution units and the plurality of information technology devices comprise components of an electronic equipment rack.

4. The apparatus of claim 1 further comprising a plurality of information technology devices electrically connected to the one or more power distribution units through a plurality of power lines, wherein the power line filter device is configured to condition one or more of a plurality of signals in one or more of the plurality of power lines to prevent emission of data corresponding to one or more of the plurality of information technology devices.

5. The apparatus of claim 4 wherein the plurality of information technology devices comprise at least one of a storage drive, a processor, a server and a network switch.

6. An apparatus comprising:
one or more power distribution units;
a power line filter device electrically connected to the one or more power distribution units, wherein the power line filter device is configured to be electrically connected to a power source for the one or more power distribution units at a location between the power source and the one or more power distribution units; and
a distribution switchboard electrically connected to the power line filter device and to the one or more power distribution units at a location between the power line filter device and the one or more power distribution units, wherein:
the distribution switchboard comprises a plurality of circuit breakers;
the distribution switchboard is electrically connected to the power line filter device through at least a first power line located upstream of the distribution switchboard; and
the distribution switchboard is electrically connected to the one or more power distribution units through at least a second power line located upstream of the one or more power distribution units and downstream of the first power line.

7. The apparatus of claim 6 further comprising a plurality of information technology devices electrically connected to the one or more power distribution units through a plurality of power lines, wherein the second power line is further located upstream of the plurality of power lines.

8. The apparatus of claim 6 wherein:
the one or more power distribution units comprise a plurality of power distribution units corresponding to a plurality of electronic equipment racks; and
the plurality of electronic equipment racks comprise components of an electronic equipment module.

9. The apparatus of claim 6 wherein:
the one or more power distribution units comprise a plurality of power distribution units corresponding to a plurality of electronic equipment racks; and
the distribution switchboard is electrically connected to the plurality of power distribution units through a plurality of power lines located upstream of the plurality of power distribution units.

10. A method comprising:
electrically connecting a plurality of information technology devices to one or more power distribution units through a plurality of power lines;
electrically connecting a power source to the one or more power distribution units;
electrically connecting a power line filter device to the power source and to the one or more power distribution units at a location between the power source and the one or more power distribution units;
using the power line filter device to condition one or more of a plurality of signals in one or more of the plurality of power lines to prevent emission of data corresponding to one or more of the plurality of information technology devices; and
electrically connecting a distribution switchboard to the power source and to the power line filter device at a location between the power source and the power line filter device;
wherein the power line filter device is electrically connected to the distribution switchboard at a location between the distribution switchboard and the one or more power distribution units; and
wherein the distribution switchboard comprises a plurality of circuit breakers.

11. The method of claim 10 wherein the power line filter device is electrically connected to the one or more power distribution units through at least one power line located upstream of the one or more power distribution units and of the plurality of power lines electrically connecting the plurality of information technology devices to the one or more power distribution units.

12. The method of claim 10 wherein the one or more power distribution units and the plurality of information technology devices comprise components of an electronic equipment rack.

13. The method of claim 10 wherein the plurality of information technology devices comprise at least one of a storage drive, a processor, a server and a network switch.

14. An apparatus comprising:
one or more power distribution units, wherein a power source is electrically connected to the one or more power distribution units;
a power line filter device electrically connected to the power source and to the one or more power distribution units, wherein the power line filter device is located downstream of the power source and upstream of the one or more power distribution units;
at least one electronic equipment rack comprising the one or more power distribution units; and
a distribution switchboard electrically connected to the power source and to the power line filter device, wherein the distribution switchboard is located downstream of the power source and upstream of the power line filter device, and wherein the distribution switchboard comprises a plurality of circuit breakers.

15. The apparatus of claim 14 further comprising a plurality of information technology devices electrically connected to the one or more power distribution units through a plurality of power lines, wherein the power line filter device is configured to condition one or more of a plurality of signals in one or more of the plurality of power lines to prevent emission of data corresponding to one or more of the plurality of information technology devices.

16. The apparatus of claim 15 wherein the plurality of information technology devices comprise at least one of a storage drive, a processor, a server and a network switch.

17. The apparatus of claim 14 further comprising a plurality of information technology devices electrically connected to the one or more power distribution units through a plurality of power lines, wherein the power line filter device is electrically connected to the one or more power distribution units through at least one power line located upstream of the one or more power distribution units and of the plurality of power lines electrically connecting the plurality of information technology devices to the one or more power distribution units.

18. An apparatus comprising:
one or more power distribution units, wherein a power source is electrically connected to the one or more power distribution units;
a power line filter device electrically connected to the power source and to the one or more power distribution units, wherein the power line filter device is located downstream of the power source and upstream of the one or more power distribution units;
at least one electronic equipment rack comprising the one or more power distribution units; and
a distribution switchboard electrically connected to the power line filter device and to the one or more power distribution units, wherein:
the distribution switchboard is located downstream of the power line filter device and upstream of the one or more power distribution units;
the distribution switchboard comprises a plurality of circuit breakers;
the distribution switchboard is electrically connected to the power line filter device through at least a first power line located upstream of the distribution switchboard; and
the distribution switchboard is electrically connected to the one or more power distribution units through at least a second power line located upstream of the one or more power distribution units and downstream of the first power line.

19. The apparatus of claim 18 further comprising a plurality of information technology devices electrically connected to the one or more power distribution units through a plurality of power lines, wherein the second power line is further located upstream of the plurality of power lines.

20. The apparatus of claim 18 wherein:
the one or more power distribution units comprise a plurality of power distribution units corresponding to a plurality of electronic equipment racks; and
the plurality of electronic equipment racks comprise components of an electronic equipment module.

* * * * *